(12) United States Patent
Sommer et al.

(10) Patent No.: US 6,284,860 B1
(45) Date of Patent: Sep. 4, 2001

(54) CROSS-LINKABLE ORGANOPOLYSILOXANE MATERIALS FORMED INTO ELASTOMERS BY SEPARATING ALCOHOLS

(75) Inventors: Oswin Sommer; Wolfgang Hechtl; Stefan Oberneder; Norman Dorsch, all of Burghausen; Rudolf Heinrich, Emmerting, all of (DE)

(73) Assignee: Wacker-Chemie GmbH, München (DE)

( * ) Notice: Subject to any disclaimer, the term of this patent is extended or adjusted under 35 U.S.C. 154(b) by 0 days.

(21) Appl. No.: 09/463,206

(22) PCT Filed: Jul. 2, 1998

(86) PCT No.: PCT/EP98/04099

§ 371 Date: Jan. 20, 2000

§ 102(e) Date: Jan. 20, 2000

(87) PCT Pub. No.: WO99/06486

PCT Pub. Date: Feb. 11, 1999

(30) Foreign Application Priority Data

Jul. 31, 1997 (DE) .............................. 197 33 168

(51) Int. Cl.$^7$ .......................... C08G 77/08; C08G 77/26
(52) U.S. Cl. ................. 528/23; 528/34; 528/38; 556/458; 556/459
(58) Field of Search .................. 528/34, 38, 23; 556/458, 459

(56) References Cited

U.S. PATENT DOCUMENTS 4,536,540   8/1985   Dziark .
4,727,127 * 2/1988   Suzuki .
4,942,211   7/1990   Sommer et al. .
5,196,497   3/1993   Weber et al. .

FOREIGN PATENT DOCUMENTS

| 195 07 416 C1 | 9/1996 | (DE) . |
| 2 214 289 A1 | 9/1996 | (CA) . |

OTHER PUBLICATIONS

Derwent Abstract corresponding to DE 19507416 (AN 1996–425400).

* cited by examiner

*Primary Examiner*—Robert Dawson
*Assistant Examiner*—Kuo-Liang Peng
(74) *Attorney, Agent, or Firm*—Brooks & Kushman P.C.

(57) ABSTRACT

The present invention pertains to the preparation of organopolysiloxanes containing organyloxy groups by reacting organopolysiloxane(s) bearing terminal hydroxyl groups with an alkoxysilane having at least two alkoxy groups and a radical which contains at least one secondary or tertiary amino group bonded to silicon by a divalent $C_{1-2}$ hydrocarbon radical, the reaction being catalyzed by an acidic ester of phosphoric acid having the formula $$(HO)_aOP-(O-R^7)_{3-a}$$

Where $R^7$ is an oxyalkylated active hydrogen component, preferably an oxyalkylated fatty alcohol. RTV-1 compositions containing the reaction product exhibit extended storage life.

5 Claims, No Drawings

CROSS-LINKABLE ORGANOPOLYSILOXANE MATERIALS FORMED INTO ELASTOMERS BY SEPARATING ALCOHOLS

TECHNOLOGICAL FIELD

The invention relates to the preparation of organopolysiloxanes containing organyloxy groups by reaction of organopolysiloxanes containing hydroxyl end groups with an alkoxysilane containing a secondary or tertiary amino group in the presence of an acid, and the use of the reaction product as RTV-1-alkoxy compositions.

DESCRIPTION OF THE RELATED ART

In the context of the present invention, the term organopolysiloxanes is to include dimeric, oligomeric and polymeric siloxanes.

Organopolysiloxane compositions which can be stored with exclusion of moisture and on ingress of moisture crosslink at room temperature, alcohols being split off, so-called RTV-1-alkoxy compositions, have already been known for a long time. They essentially comprise an organopolysiloxane with organyloxy end groups and, as further constituents, a crosslinking agent with at least three hydrolysable groups, catalyst and optionally additives. The advantage of these RTV-1-alkoxy systems is that during the crosslinking operation they provide odourless, neutral, ecoalcohols as cleavage products.

An organopolysiloxane with organyloxy end groups is prepared by reactions of an organopolysiloxane with HO end groups with alkoxysilanes. This is described, for example, in U.S. Pat. No. 4,942,211. A disadvantage of this process is that the reaction takes several hours at room temperature. The reaction time is indeed shortened at elevated temperature, but is still so long that it is necessary to wait until RTV-1-alkoxy compositions can be prepared with the organopolysiloxanes formed, having organyloxy end groups, and further constituents. The reaction of an organopolysiloxane with HO end groups with alkoxysilanes in the presence of various catalysts is known. For example, in U.S. Pat. No. 5,196,497 the reaction is carried out in the presence of alkali metal hydroxides. However, deactivation of the catalysts requires a further reaction step.

SUMMARY OF THE INVENTION

The invention is based on the object of preparing RTV-1-alkoxy compositions in the simplest possible manner.

DETAILED DESCRIPTION OF THE INVENTION

The invention relates to a process for the preparation of an organopolysiloxane with organyloxy end groups, in which (A) an organopolysiloxane with HO end groups is reacted with (B) an alkoxysilane which has at least two alkoxy groups and a radical which contains at least one secondary or tertiary amino group, which is bonded to the silicon atom via a divalent $C_{1-12}$-hydrocarbon radical, in the presence of (C) a Brönstedt or Lewis acid.

The process proceeds selectively at an extremely high rate of reaction even at room temperature, so that immediately after components (A), (B) and (C) have been mixed the organopolysiloxane formed, with organyloxy end groups, can be employed ELS an RTV-1-alkoxy composition, optionally after admixing of further constituents.

Another advantage of this process is to be seen in that no side reactions proceed here and, for example, the formation of T and Q units is not observed on a linear organopolysiloxane. The ammonium salts formed do not have to be removed from the reaction product, since they do not cause trouble in RTV-1-alkoxy compositions and even have an accelerating action on the rate of vulcanization. An excess of Brönstedt or Lewis acid (C) causes trouble neither in the organopolysiloxane formed, with organyloxy end groups, nor in the RTV-1-alkoxy compositions.

Linear $\alpha,\omega$-dihydroxypoly(diorganosiloxanes) of the general formula (I)

$$HO\text{---}[R_2SiO]_m\text{---}H \qquad (I),$$

wherein

R denotes monovalent $C_1$–$C_8$-hydrocarbon radicals which are optionally substituted by fluorine, chlorine, bromine, $C_1$–$C_4$-alkoxyalkyl or cyano groups and m denotes values which correspond to a viscosity of the organopolysiloxane (A) with HO end groups of 0.05 to 1000 Pa.s, are preferably employed as the organopolysiloxane (A) with HO end groups.

Examples of hydrocarbon radicals R are linear and cyclic saturated and unsaturated alkyl radicals, such as the methyl radical, aryl radicals, such as the phenyl radical, alkaryl radicals, such as tolyl radicals, and aralkyl radicals, such as the benzyl radical.

Unsubstituted hydrocarbon radicals having 1 to 6 carbon atoms are preferred as radical R, the methyl radical being particularly preferred.

The organopolysiloxanes (A) preferably have a viscosity of 100 to 1,000,000 mPa.s, in particular 20,000 to 350,000 mPa.s, in each case measured at 23° C.

Alkoxysilanes of the general formula (II)

$$(R^1O)_nSiR^2_{(3-n)}R^3 \qquad (II),$$

in which $R^1$ and $R^2$ each denote monovalent $C_1$–$C_{10}$-hydrocarbon radicals which are optionally substituted by fluorine, chlorine, bromine, $C_1$–$C_4$-alkoxyalkyl or cyano groups, n denotes the values 2 or 3, $R^3$ denotes a monovalent radical of the general formula (III)

$$H_pR^4_{(2-p)}N[\text{---}R^5\text{---}NR^6]_q\text{---}(CH_2)\text{---}R^5\text{---} \qquad (III),$$

$R^4$ denotes monovalent $C_1$–$C_{10}$-alkyl radicals which are optionally substituted by fluorine, chlorine, bromine, $C_1$–$C_4$-alkoxyalkyl or cyano groups, $R^5$ denotes divalent $C_1$–$C_{12}$-alkylene radicals which are optionally substituted by fluorine, chlorine, bromine, $C_1$–$C_4$-alkoxyalkyl or cyano groups, $R^6$ denotes a hydrogen radical or monovalent $C_1$–$C_{10}$-alkyl radicals which are optionally substituted by fluorine, chlorine, bromine, $C_1$–$C_4$-alkoxyalkyl or cyano groups, p denotes the values 0 or 1 and q denotes the values 0, 1, 2 or 3, are preferably employed as the alkoxysilane (B).

$R^1$ and $R^2$ preferably denote in each case unsubstituted $C_1$–$C_6$-hydrocarbon radicals, in particular methyl, ethyl and propyl radicals.

$R^4$ preferably denotes linear and cyclic saturated $C_1$–$C_{10}$-alkyl radicals, in particular $C_1$–$C_8$-alkyl radicals.

$R^5$ preferably denotes linear and branched saturated $C_1$–$C_{10}$-alkyl radicals, in particular $C_1$–$C_8$-alkyl radicals. In particular, the radicals $R^5$ are unsubstituted.

$R^6$ preferably has a hydrogen radical and the preferred meanings of $R^4$. The hydrogen radical is particularly preferred.

p preferably has the value 1.

Examples of Brönstedt or Lewis acids (C) which can be employed are mineral, carboxylic and sulphonic acids and metal compounds, metal salts and metal complex salts which function as Lewis acids. Examples of Lewis acids are $BF_3$, $AlCl_3$, $TiCl_3$, $SnCl_4$, $SO_3$, $PCl_5$, $POCl_3$, $FeCl_3$ and hydrates thereof and $ZnCl_2$. Examples of Brönstedt acids are boric, tetrafluoroboric and nitric acid, nitrous acid, phosphoric acid, phosphorous acid, hypophosphorous acid, acidic phosphoric esters, acidic polyphosphoric esters, sulphuric acid, sulphurous acid, peroxosulphuric, hydrochloric, hydrofluoric, hydroiodic, hydrobromic, perchloric and hexachlorophosphoric acid, and benzenesulp.,.onic, p-toluenesulphonic, methanesulphonic, trifluoromethanesulphonic and carboxylic acids, such as chloroacetic, trichloroacetic, acetic, acrylic, benzoic, trifluoroacetic, citric, crotonic, formic, fumaric, maleic, malonic, gallic, itaconic, lactic, tartaric, oxalic, phthalic and succinic acid.

Compounds which hydrolyse with water and form Brönstedt acids can also be employed in the process. In this case, as much water as is necessary to form the Brönstedt acids must be employed at the same time. For example, hydrolysis-sensitive carboxysilanes, such as methyltriacetoxysilane, or siloxaness can be employed. The water required for the hydrolysis can also be adsorbed on solids, such as fillers.

Particularly preferred Brönstedt acids (C) are acidic phosphoric esters of the general formula (IV)

$$(HO)_a OP(-O-R^7)_{(3-a)} \qquad (IV)$$

in which $R^7$ denotes a monovalent $C_3$- to $C_{50}$-hydrocarbon radical which is optionally substituted by hydroxyl, fluorine, chlorine, bromine, $C_1$–$C_{10}$-alkoxyalkyl or cyano groups and can be interrupted by radicals, bonded to carbon atoms on both sides, from the group consisting of —O—, —COO—, —OOC—, —CONR$^2$—, —NR$^2$CO— and —CO— and a denotes the values 1 or 2.

The reaction products of the acidic phosphoric esters of the general formula (IV, stabilize the organopolysiloxane formed, with organyloxy end groups, and RTV-1-alkoxy compositions prepared therefrom, during storage. In particular, the skin formation times of the RTV-1-alkoxy compositions remain virtually constantly stable and discoloration is suppressed. The acidic phosphoric esters of the general formula (IV) preferably have a surfactant character.

The hydrocarbon radicals $R^7$ can be linear and cyclic saturated and unsaturated, branched and unbranched alkyl radicals, aryl radicals, alkaryl radicals and aralkyl radicals.

Preferred hydrocarbon radicals $R^7$ have the general formula (V)

$$[(CR^8_2)_b-O]_c[(CR^9_2)_d]_o-L-M \qquad (V)$$

in which $R^8$ and $R^9$ denote a hydrogen, methyl or hydroxyl radical, b and d denote the values 2 or 3, c denotes integral values from 1 to 15, o denotes the values 0 or 1, L denotes a radical from the group consisting of —O—, —COO—, —OOC—, —CONR$^2$—, —NR$^2$CO— and —CO— and M denotes a monovalent $C_1$- to $C_{20}$-hydrocarbon radical which is optionally substituted by hydroxyl, fluorine, chlorine, bromine, $C_1$–$C_{10}$-alkoxyalkyl or cyano groups, with the proviso that the radicals $R^8$ and $R^9$ on each carbon atom can be a hydroxyl radical only once.

c preferably denotes integral values from 1 to 10. L preferably denotes a radical —O—.

M preferably denotes a $C_1$- to $C_{20}$-hydrocarbon radical which is optionally substituted by $C_1$–$C_{10}$-alkoxyalkyl groups.

The hydrocarbon radicals $R^7$ of the general formula (V) in which $R^8$ and $R^9$ denote a hydrogen radical, b and d denote the value 2, c denotes the values 2, 3, 4 or 5, L denotes a radical —O— and M denotes an unsubstituted $C_5$–$C_{18}$-hydrocarbon radical are particularly preferred.

In the general formulae (I) to (V), all the radicals $R^1$ to $R^9$ and all the indices a, b, c, d, m, n, o, p and q independently of one another are identical or different.

In all the formulae, the silicon atom is tetravalent. For example, n+o is at most 4.

The Brönstedt or Lewis acids (C) are preferably employed in equivalent amounts, in particular in a slight excess, based on acidic groups and on the hydroxyl groups of the organopolysiloxane (A) with HO end groups.

In contrast, the alkoxysilanes (B) are preferably added to the organopolysiloxanes (A) with HO end groups in an excess as regards the stoichiometric ratios. In order to allow the reaction of the organopolysiloxanes (A) with HO end groups with alkoxysilanes (C) to proceed as completely as possible, 1 to 50 parts by weight of the alkoxysilanes (B) per 500 parts, by weight of the organopolysiloxanes (A) with HO end groups can preferably be employed. The excess of alkoxysilanes (B) which have not reacted during the reaction is not a disadvantage in the organopolysiloxane with organyloxy end groups and the RTV-1-alkoxy compositions and can therefore remain in the reaction product. An excess of alkoxysilanes (B) can act as an adhesion promoter in the RTV-1-alkoxy compositions.

The reaction is preferably carried out at temperatures from +20 to +50° C., in particular at room temperature. The reaction time is 1–10 minutes, depending on the alkoxysilanes (B) employed.

The rate of reaction during the reaction depends on the one hand on the reactivity of the alkoxysilane (B) used, and on the other hand on the acidity of the Brönstedt or Lewis acids (C).

The particularly preferred reaction time at room temperature is 1–5 minutes, which is of advantage precisely for the preparation of RTV-1 compositions in a one-pot process.

The invention also relates to RTV-1-alkoxy compositions which comprise the reaction product prepared by the above process, which comprises as the essential constituent organopolysiloxane with organyloxy end groups. The invention particularly relates to RTV-1-alkoxy compositions which comprise the reaction product which is prepared by employing the acidic phosphoric esters of the general formula (IV).

The organopolysiloxanes with organyloxy end groups and the RTV-1-alkoxy compositions prepared with these can be stabilized with metal salts of branched carboxylic acids in order to achieve an improved storage stability of the finished compositions, as described in U.S. Pat. No. 4,942,211.

In addition to the abovementioned components, the RTV-1-alkoxy compositions can comprise further components which are known per se.

Further substances which can preferably be co-used in the preparation of the RTV-1-alkoxy compositions are silanes of the general formula (VI)

$$R^{10}_{\mu}Si(OR^{11})_{4-\mu} \quad (VI)$$

wherein $R^{10}$ and $R^{11}$ denote monovalent $C_1$–$C_{13}$-hydrocarbon radicals which are optionally substituted by fluorine, chlorine, bromine, $C_1$–$C_4$-alkoxyalkyl or cyano groups and $\mu$ denotes the values 0, 1 or 2, or partial hydrolysis products thereof.

Preferred meanings of $R^{10}$ and $R^{11}$ are given above for R.

Partial hydrolysis products of silanes of the general formula (VI) are, for example, hexamethoxydisiloxane and hexaethoxydisiloxane.

Further substances which can preferably be co-used in the preparation of the RTV-1-alkoxy compositions are bis (trialkoxysilyl) $C_1$–$C_{12}$-alkanes, in which the alkoxy radicals have the meanings of $OR^{11}$, for example bis (triethoxysilyl)ethane.

In the preparation of the RTV-1-alkoxy compositions, it is likewise possible to use condensation catalysts, reinforcing fillers, non-reinforcing fillers, pigments, soluble dyes, odoriferous substances, plasticizers, such as dimethylpolysiloxanes which are blocked by trimethylsiloxy end groups and are liquid at room temperature or phosphoric esters, fungicides, resinous organopolysiloxanes, including those of $(CH_3)_3SiO_{1/2}$ and $SiO_{4/2}$ units, purely organic resins, such as homo- or copolymers of acrylonitrile, styrene, vinyl chloride or propylene, it being possible for such purely organic resins, in particular copolymers of styrene and n-butyl acrylate, to have been produced already in the presence of diorganopolysiloxane containing in each case one Si-bonded hydroxyl group in the terminal units by polymerization of the monomers mentioned by means of free radicals, corrosion inhibitors, polyglycols, which can be esterified and/or etherified, oxidation inhibitors, heat stabilizers, solvents, agents for influencing the electrical properties, such as conductive carbon black, flame-retardant agents, light stabilizers and agents for prolonging the skin formation time, such as silanes with SiC-bonded mercaptoalkyl radicals, and cell-generating agents, for example azodicarboxamide. Adhesion promoters, preferably amino-functional silanes, can likewise be added.

Condensation catalysts are preferably employed. According to the invention, the RTV-1-alkoxy compositions can comprise any desired condensation catalysts which were also possible to date in compositions which are stable to storage with exclusion of water and on ingress of water crosslink to elastomers at room temperature.

Examples of such condensation catalysts are organic compounds of tin, zinc, zirconium, titanium and aluminium. Among these condensation catalysts, preferred catalysts are butyl titanates and organic tin compounds, such as di-n-butyltin diacetate, di-n-butyltin dilaurate and reaction products of a silane containing, per molecule, as hydrolysable groups, at least two monovalent hydrocarbon radicals which are bonded to silicon via oxygen and are optionally substituted by an alkoxy group, or an oligomer thereof, with a diorganotin diacylate, all the valencies of the tin atoms in these reaction products being satisfied by oxygen atoms of the grouping

or by SnC-bonded monovalent organic radicals.

The RTV-1-alkoxy compositions preferably comprise fillers. Examples of fillers are non-reinforcing fillers, that is to say fillers having a BET surface area of up to 50 m²/g, such as quartz, diatomaceous earth, calcium silicate, zirconium silicate, zeolites, metal oxide powders, such as aluminium, titanium, iron or zinc oxides and mixed oxides thereof, barium sulphate, calcium carbonate, gypsum, silicon nitride, silicon carbide, boron nitride and powders of glass and plastic, such as polyacrylonitrile powder; reinforcing fillers, that is to say fillers having a BET surface area of more than 50 m²/g, such as pyrogenically prepared silica, precipitated silica, carbon black, such as furnace and acetylene black, and silicon-aluminium mixed oxides of high BET surface area; and fibrous fillers, such as asbestos and synthetic fibres.

The fillers mentioned can be hydrophobized, for example by treatment with organosilanes or -siloxanes or with stearic acid or by etherification of hydroxyl groups to alkoxy groups. One type of filler can be employed, and it is also possible to employ a mixture of at least two fillers.

The customary water content from the atmosphere is sufficient for the crosslinking of the RTV-1-alkoxy compositions. If desired, the crosslinking can also be carried out at temperatures higher or lower than room temperature, for example at −5° to 10° C. or at 30° to 50° C.

The RTV-1-alkoxy compositions according to the invention are therefore outstandingly suitable, for example, as sealing compositions for joints, including perpendicularly running joints, and similar empty spaces of, for example, 10 to 40 mm inside clearance, for example in buildings and land, water and air vehicles, or as adhesives or cementing compositions, for example in window construction or in the production of display windows, and, for example, for the production of protective coatings or of rubbery-elastic shaped articles, and for insulating electrical or electronic devices.

In the examples described below, all the parts stated with percentages relate to the weight, unless stated otherwise. Furthermore, all the viscosity data relate to a temperature of 25° C. Unless stated otherwise, the. following examples are carried out under a pressure of the surrounding atmosphere, that is to say under about 1000 hPa, and at room temperature, that is to say at about 20° C., or at a temperature which is established when the reactants are brought together at room temperature without additional heating or cooling.

EXAMPLES

Example 1

500 parts by weight of a dimethylpolysiloxane which contains in each case one hydroxyl group in the terminal units and has a viscosity of 80,000 mPa.s at 22° C. are mixed with 5 parts by weight of 3-cyclo-hexylaminopropyltrimethoxysilane (available commercially from Wacker-Chemie GmbH) at a temperature of 23° C. in a planetary mixer with vacuum equipment. 1.3 parts by weight of acetic acid (concentrated) are immediately added to the mixture, the components are mixed and 300 g of a polydimethyl-siloxane with trimethylsiloxy groups in the terminal units and a viscosity of 100 m²/s (23° C.), 10 g of zinc 2-ethylhexoate, 80 g of pyrogenic, hydrophobic silica with a BET surface area of 150 m²/g, 40 g of tetraethyl silicate and 1 g of di-n-butoxy-bis(triethoxy-siloxy)stannane are added in the stated sequence.

After homogenization in vacuo, the compound is introduced into moisture-proof drums. Samples are taken after various periods of time and the physical properties of the elastomers produced therefrom are determined. The results achieved here are shown in Table 1.

Example 2

The procedure is analogous to Example 1. The following ingredients are admixed in the stated sequence to 500 parts by weight of α,ω-dihydroxypolyorganosiloxane:

| | | |
|---|---|---|
| 300.0 | parts by weight of | polydimethylsiloxane with —Si(CH$_3$)$_3$ end groups |
| 80.0 | parts by weight of | pyrogenic, hydrophobic silica with a BET surface area of 150 m$^2$/g |
| 5.0 | parts by weight of | 3-cyclohexylaminopropyltrimethoxysilane |
| 3.5 | parts by weight of | methyltriacetoxysilane |
| 40.0 | parts by weight of | a 1/1 mixture of vinyltrimethoxysilane and methyltrimethoxysilane |

Example 3

The procedure is analogous to Example 1. The following ingredients are added to 500 parts by weight of polydimethylsiloxane with —Si(CH$_3$)$_2$—OH end groups:

| | | |
|---|---|---|
| 6.0 | parts by weight of | 3-cyclohexylaminopropyltriethoxysilane |
| 2.8 | parts by weight of | 2-ethylhexanoic acid |
| 385.0 | parts by weight of | polydimethylsiloxane with —Si(CH$_3$)$_3$ end groups |
| 8.0 | parts by weight of | calcium 2-ethylhexoate |
| 78.0 | parts by weight of | pyrogenic hydrophobic silica with a BET surface area of 150 m$^2$/g |
| 38.0 | parts by weight of | polyethoxysiloxane |

Example 4

The procedure is analogous to Example 1. The following are mixed:

| | | |
|---|---|---|
| 500.0 | parts by weight of | polydimethylsiloxane with —Si(CH$_3$)$_2$—OH end groups |
| 2.0 | parts by weight of | phosphoric acid |
| 5.0 | parts by weight of | 3-cyclohexylaminopropyltrimethoxysilane |
| 385.0 | parts by weight of | polydimethylsiloxane with —Si(CH$_3$)$_3$ end groups |
| 4.0 | parts by weight of | zinc 2-ethylhexoate |
| 80.0 | parts by weight of | pyrogenic hydrophobic silica with a BET surface area of 150 m$^2$/g |
| 39.0 | parts by weight of | a 1/1 mixture of polyethoxysiloxane with 1,2-bis(triethoxysilyl) ethane |

Example 5

The procedure is analogous to Example 1. The following are mixed:

| | | |
|---|---|---|
| 500.0 | parts by weight of | polydimethylsiloxane with —Si(CH$_3$)$_2$—OH end groups |
| 3.5 | parts by weight of | butylaminopropyltrimethoxysilane |
| 1.0 | parts by weight of | acetic acid (concentrated) |
| 385.0 | parts by weight of | polydimethylsiloxane with —Si(CH$_3$)$_3$ end groups |
| 4.0 | parts by weight of | zinc 2-ethylhexoate |
| 85.0 | parts by weight of | pyrogenic hydrophobic silica with a BET surface area of 150 m$^2$/g |
| 35.0 | parts by weight of | polyethoxysiloxane |

Example 6

The procedure is analogous to Example 1. The following are mixed:

| | | |
|---|---|---|
| 500.0 | parts by weight of | polydimethylsiloxane with —Si(CH$_3$)$_2$—OH end groups |
| 4.0 | parts by weight of | alkoxylated phosphoric ester |
| 8.0 | parts by weight of | 3-cyclohexylaminopropyltrimethoxysilane |
| 385.0 | parts by weight of | polydimethylsiloxane with —Si(CH$_3$)$_3$ end groups |
| 3.8 | parts by weight of | zinc 2-ethylhexoate |
| 70.0 | parts by weight of | pyrogenic hydrophobic silica with a BET surface area of 150 m$^2$/g |
| 30.0 | parts by weight of | polyethoxysiloxane |

The alkoxylated phosphoric ester has the following formula:

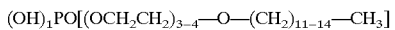

and

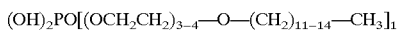

TABLE 1

Mechanical properties (film value 2 mm)

| Examples | Storage time before vulcanization | Shore A DIN 53505 | Tensile strength DIN 53504/S2 N/mm² | Elongation at break DIN 53504/52 % | Tear propagation resistance ISO 34 Method C N/mm | Tensile stress DIN 53504/S2 100% elongation | Skin formation time | Comments |
|---|---|---|---|---|---|---|---|---|
| 1 | 0 value | 16 | 0.8 | 300 | 2.0 | 0.28 | 35 | Vulcanization product transparent |
|  | 14 days | 16 | 0.8 | 290 | 1.9 | 0.28 |  |  |
|  | 28 days | 14 | 0.9 | 300 | 1.6 | 0.30 | 70 | Vulcanization product yellowish |
| 2 | 0 value | 15 | 0.8 | 310 | 1.9 | 0.26 | 30 | Vulcanization product transparent |
|  | 14 days | 13 | 0.8 | 320 | 1.7 | 0.25 |  |  |
|  | 28 days | 11 | 0.9 | 360 | 1.6 | 0.30 | 60 | Vulcanization product yellowish |
| 3 | 0 value | 15 | 0.9 | 300 | 1.7 | 0.28 | 40 | Vulcanization product transparent |
|  | 14 days | 15 | 1.0 | 260 | 1.7 | 0.28 |  |  |
|  | 28 days | 14 | 0.8 | 240 | 1.5 | 0.30 | 120 | Vulcanization product yellowish |
| 4 | 0 value | 17 | 1.1 | 340 | 2.3 | 0.38 | 30 | Vulcanization product transparent |
|  | 28 days | 17 | 1.2 | 330 | 2.2 | 0.34 | 60 | Vulcanization product transparent |
| 5 | 0 value | 14 | 0.7 | 290 | 1.5 | 0.29 | 45 | Vulcanization product transparent |
|  | 28 days | 13 | 0.7 | 300 | 1.5 | 0.28 | 90 | Vulcanization product yellowish |
| 6 | 0 value | 16 | 1.0 | 320 | 2.1 | 0.37 | 40 | Vulcanization product transparent |
|  | 28 days | 17 | 1.0 | 330 | 2.3 | 0.37 | 35 | Vulcanization product transparent |
|  | 56 days | 16 | 0.9 | 305 | 2.0 | 0.35 | 52 | Vulcanization product transparent |
|  | 84 days | 17 | 1.1 | 280 | 2.1 | 0.34 | 55 | Vulcanization product transparent |

Comparison Example 1

The procedure is analogous to Example 1. The following are mixed in vacuo in the following sequence:

| 500.0 | parts by weight of | polydimethylsiloxane with —Si(CH₃)₂—OH end groups |
| 385.0 | parts by weight of | polydimethylsiloxane with —Si(CH₃)₃ end groups |
| 4.0 | parts by weight of | beta-aminoethyl-gamma-aminopropyl-trimethoxysilane |
| 1.2 | parts by weight of | acetic acid (concentrated) |
| 31.0 | parts by weight of | polyethoxysiloxane |
| 70.0 | parts by weight of | pyrogenic hydrophobic silica with a BET surface area of 150 m²/g |
| 3.8 | parts by weight of | zinc 2-ethylhexoate |

Comparison Example 2

The procedure is analogous to Example 1. The following are mixed in vacuo in the following sequence:

| 500.0 | parts by weight of | polydimethylsiloxane with —Si(CH₃)₂—OH end groups |

-continued

| | | |
|---|---|---|
| 385.0 | parts by weight of | polydimethylsiloxane with —Si(CH$_3$)$_3$ end groups |
| 4.0 | parts by weight of | beta-aminoethyl-gamma-aminopropyl-trimethoxysilane |
| 2.5 | parts by weight of | acetic acid (concentrated) |
| 31.0 | parts by weight of | polyethoxysiloxane |
| 70.0 | parts by weight of | pyrogenic hydrophobic silica with a BET surface area of 150 m$^2$/g |
| 3.8 | parts by weight of | zinc 2-ethylhexoate |

Comparison Example 3

The procedure is analogous to Example 1. The following are mixed in vacuo in the following sequence:

| | | |
|---|---|---|
| 500.0 | parts by weight of | polydimethylsiloxane with —Si(CH$_3$)$_2$—OH end groups |
| 385.0 | parts by weight of | polydimethylsiloxane with —Si(CH$_3$)$_3$ end groups |
| 4.0 | parts by weight of | beta-aminoethyl-gamma-aminopropyl-trimethoxysilane |
| 5.0 | parts by weight of | acetic acid (concentrated) |
| 31.0 | parts by weight of | polyethoxysiloxane |
| 70.0 | parts by weight of | pyrogenic hydrophobic silica with a BET surface area of 150 m$^2$/g |
| 3.8 | parts by weight of | zinc 2-ethylhexoate |

Comparison Example 4

The procedure is analogous to Example 1. The following are mixed in vacuo in the following sequence:

| | | |
|---|---|---|
| 500.0 | parts by weight of | polydimethylsiloxane with —Si(CH$_3$)$_2$—OH end groups |
| 300.0 | parts by weight of | polydimethylsiloxane with —Si(CH$_3$)$_3$ end groups |
| 4.5 | parts by weight of | gamma-aminopropyl-triethoxysilane |
| 3.5 | parts by weight of | methyltriacetoxy silane |
| 80.0 | parts by weight of | pyrogenic hydrophobic silica with a BET surface area of 150 m$^2$/g |
| 40.0 | parts by weight of | a mixture of vinyl/methyltrimethoxy silane (1/1) |
| 3.0 | parts by weight of | di-butyltin di-2-ethylhexoate |

Comparison Example 5

The procedure is analogous to Example 1. The following are mixed in vacuo in the following sequence:

| | | |
|---|---|---|
| 500.0 | parts by weight of | polydimethylsiloxane with —Si(CH$_3$)$_2$—OH end groups |
| 300.0 | parts by weight of | polydimethylsiloxane with —Si(CH$_3$)$_3$ end groups |
| 3.0 | parts by weight of | gamma-aminopropyl-trimethoxysilane |
| 1.5 | parts by weight of | phosphoric acid |
| 80.0 | parts by weight of | pyrogenic hydrophobic silica with a BET surface area of 150 m$^2$/g |
| 31.0 | parts by weight of | polyethoxysiloxane |

Table 2: Results of the Comparison Experiments

Example 1 Compound stiffened after 1 hour
Example 2 Compound stiffened after 3 hours
Example 3 Compound stiffened after 22 hours
Example 4 Compound stiffened after 4 hours
Example 5 Compound stiffened after 13 hours

What is claimed is:

1. Process for the preparation of an organopolysiloxane with organyloxy end groups, in which
    (A) an organopolysiloxane with HO end groups is reacted with
    (B) an alkoxysilane which has at least two alkoxy groups and a radical which contains at least one secondary or tertiary amino group, which is bonded to the silicon atom via a divalent C$_{1-12}$-hydrocarbon radical, in the presence of
    (C) an acidic phosphoric ester of the general formula (IV)

$$(HO)_a OP(-O-R^7)_{(3-a)} \qquad (IV)$$

in which
    R$^7$ has the general formula V $$[(CR^8{}_2)_b-O]_c[(CR^9{}_2)_d]_o-L-M \qquad (V)$$

in which
    R$^8$ and R$^9$ denote a hydrogen, methyl or hydroxyl radical,
    b and d denote the values 2 or 3,
    c denotes integral values from 1 to 15,
    a denotes the values 1 or 2,
    L denotes a radical from the group consisting of —O—, —COO—, —OOC—, —CONR$^2$—, —NR$^2$CO— and —CO— wherein R$^2$ denotes a monovalent C$_1$–C$_{10}$-hydrocarbon radical which is optionally substituted by flourine, chlorine, bromine, C$_1$–C$_4$-alkoxyalkyl or cyano group,
    M denotes a monovalent C$_1$— to C$_{20}$-hydrocarbon radical which is optionally substituted by hydroxyl, fluorine, chlorine, bromine, C$_1$–C$_{10}$-alkoxyalkyl or cyano groups, with the proviso that only one of the radicals R$^8$ and R$^9$ on a given carbon atom can be a hydroxyl radical o denotes 0 or 1.

2. The process of claim 1, in which linear α-ω-dihydroxypoly(diorganao)siloxanes of the general formula (I), $$HO-[R_2SiO]_m-H \qquad (I),$$

wherein
R denotes monovalent C$_1$–C$_8$-hydrocarbon radicals which are optionally substituted by fluorine, chlorine, bromine, C$_1$–C$_4$-alkoxyalkyl or cyano groups and m denotes values which correspond to a viscosity of the organopolysiloxane (A) with HO end groups of 0.05 to 1000 Pa.s, are employed as the organopolysiloxane (A) with HO end groups.

3. The process of claim 1, in which alkoxysilanes of the general formula (II)

$$(R^1O)_n SiR^2{}_{(3-n)} R^3 \qquad (II),$$

in which

R$^1$ and R$^2$ each denote monovalent C$_1$–C$_{10}$-hydrocarbon radicals which are optionally substituted by fluorine, chlorine, bromine, C$_1$–C$_4$-alkoxyalkyl or cyano groups, n is 2 or 3, R$^3$ denotes a monovalent radical of the general formula (III)

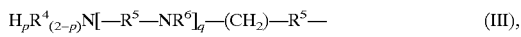
$$H_p R^4{}_{(2-p)} N[-R^5 - NR^6]_q - (CH_2) - R^5 - \qquad (III),$$

R$^4$ denotes a monovalent C$_1$–C$_{10}$-alkyl radical optionally substituted by fluorine, chlorine, bromine, C$_1$–C$_4$-alkoxyalkyl or cyano groups, R$^5$ denotes a divalent C$_1$–C$_{12}$-alkylene radical optionally substituted by fluorine, chlorine, bromine, C$_1$–C$_4$-alkoxyalkyl or cyano group, R$^6$ denotes a hydrogen radical or monovalent C$_1$–C$_4$-alkoxyalkyl or cyano group, p is 0 or 1 and q is 0, 1, 2 or 3, are employed as the alkoxysilane (B).

4. The process of claim 2, in which alkoxysilanes of the general formula (II)

$$(R^1O)_n SiR^2{}_{(3-n)} R^3 \qquad (II),$$

in which

R$^1$ and R$^2$ each denote monovalent C$_1$–C$_{10}$-hydrocarbon radicals which are optionally substituted by fluorine, chlorine, bromine, C$_1$–C$_4$-alkoxyalkyl or cyano groups, n is 2 or 3, R$^3$ denotes a monovalent radical of the general formula (III)

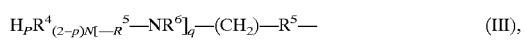
$$H_p R^4{}_{(2-p)} N[-R^5 - NR^6]_q - (CH_2) - R^5 - \qquad (III),$$

R$^4$ denotes a monovalent C$_1$–C$_{10}$-alkyl radical optionally substituted by fluorine, chlorine, bromine, C$_1$–C$_4$-alkoxyalkyl or cyano groups, R$^5$ denotes a divalent C$_1$–C$_{12}$-alkylene radical optionally substituted by fluorine, chlorine, bromine, C$_1$–C$_4$-alkoxyalkyl or cyano group, R$^6$ denotes a hydrogen radical or monovalent C$_1$–C$_4$-alkoxyalkyl or cyano group, p is 0 or 1 and q is 0, 1, 2 or 3, are employed as the alkoxysilane (B).

5. In a moisture-curing RTV-1-alkoxy compositions, the improvement comprising incorporating as an alkoxy-functional polyorganosiloxane component, the reaction product obtained by the process of claim 1.

* * * * *

UNITED STATES PATENT AND TRADEMARK OFFICE
CERTIFICATE OF CORRECTION

PATENT NO. : 6,284,860 B1
DATED : September 4, 2001
INVENTOR(S) : Oswin Sommer et al.

It is certified that error appears in the above-identified patent and that said Letters Patent is hereby corrected as shown below:

Column 14,
Line 12, delete "$H_pR^4_{(2-p)N[-R}5 — NR^6]_q — (CH_2) — R^5 —$" and insert therefor -- $H_pR^4_{(2-p)}N[-R^5-NR^6]_q-(CH_2)-R^5-$ --.

Signed and Sealed this

Twenty-third Day of April, 2002

Attest:

JAMES E. ROGAN
*Attesting Officer*     *Director of the United States Patent and Trademark Office*